June 5, 1956 — F. W. ANDREWS — 2,748,393
SHAPE-RETAINING REINFORCEMENT OF DEPOSITED RUBBER UNDERGARMENT Filed July 22, 1952 — 2 Sheets-Sheet 1

INVENTOR.
FRED W. ANDREWS
BY
ATTORNEY

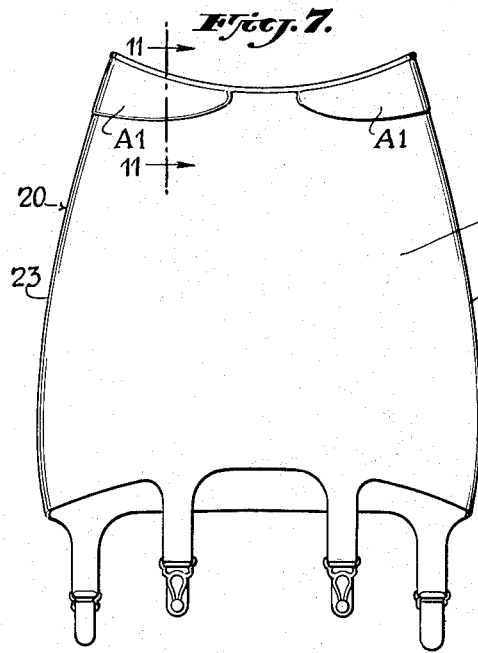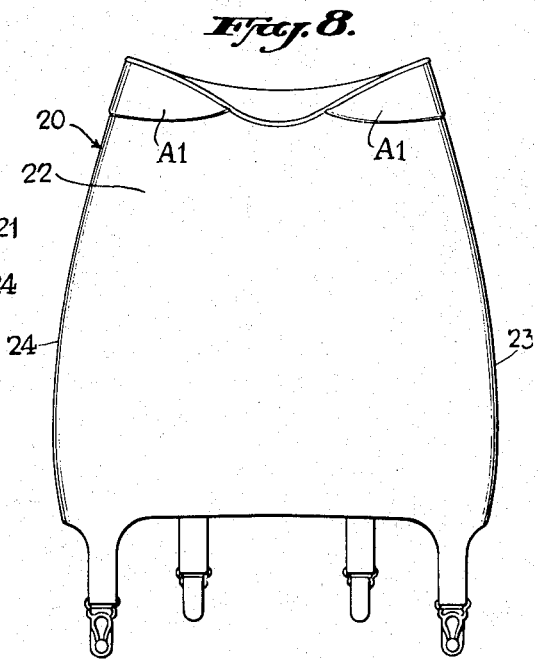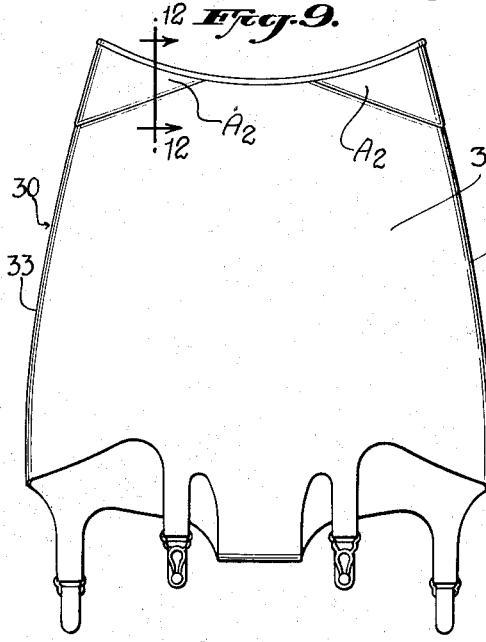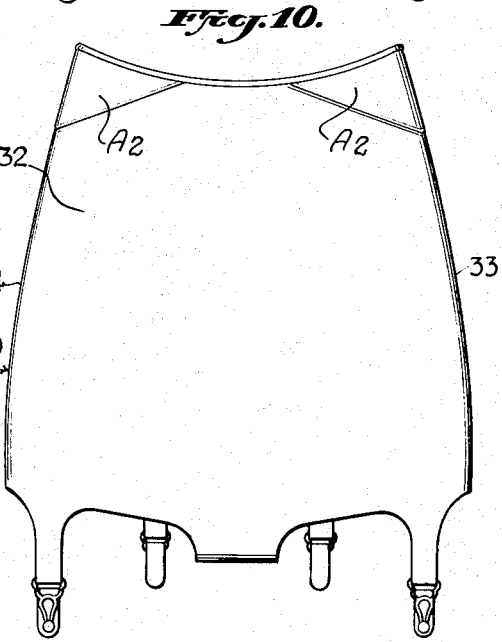

United States Patent Office 2,748,393
Patented June 5, 1956

2,748,393
SHAPE-RETAINING REINFORCEMENT OF DEPOSITED RUBBER UNDERGARMENT

Fred W. Andrews, Dover, Del., assignor to International Latex Corporation, Dover, Del., a corporation of Delaware Application July 22, 1952, Serial No. 300,319

8 Claims. (Cl. 2—36)

My invention relates to the art of making rubber latex girdles deposited on a form having a particular shape.

Such a girdle was first disclosed in the Spanel Patent 2,360,736, and has been widely adopted since its introduction.

The reasons for the universal success of the rubber latex deposited girdle are many. The using public finds them thinner, lighter in weight, freer from soil, more elastic, easier to wash for immediate use, and less expensive than girdles made by other methods and of other materials. I have ascertained however that despite the foregoing advantages, the latex girdle has, in certain instances, a tendency to collapse when firm support is necessary as for example to contain obese flesh or to prevent its drooping at the marginal areas. Collapsed marginal areas have the added objection of being unsightly and uncomfortable.

Stays or ribs have hitherto been inserted into fabric girdles but such reinforcements are rigid and non-elastic. These characteristics are difficult to associate with a rubber latex deposited girdle intended to elastically embrace the body.

Moreover the skin-like character of a rubber latex deposited girdle makes it desirable as a foundation garment, and especially under closely fitted clothes. To avoid jutting into the flesh, stays and ribs project outwardly and thus destroy the smooth invisible nature of a proper foundation garment.

Ordinarily deposited rubber latex is used in articles intended to be stretched and is therefore used in tension only.

The problem thereof is to retain sufficient elasticity in the margins to assist in the necessary elastic deformation, while stiffening these same margins against compression in certain areas to accomplish the necessary support.

Accordingly, it is an object of my invention to provide a relatively thin and light-weight rubber latex deposited girdle to elastically embrace the body, possessing adjacent and edge thereof certain shape-retaining areas which support without sagging the weight of fleshy parts of the body.

Other objects are to accomplish the foregoing while dipping the form in the latex dispersion; to provide a girdle having the desired qualities without increasing the thickness of the shape-retaining areas to a point where they would be noticeable under closely fitting outer garments; and to achieve the foregoing objects without loss of the elasticity considered necessary in the desirable embracing feature of such garment or article.

I accomplish these and other objects and obtain my new results as will be apparent from the article, forms and methods described in the following specification, particularly pointed out in the claims, and illustrated in the following drawing in which:

Figs. 7 and 8 are views respectively similar to Figs. 1 and 2 of a modified form of the invention;

Figs. 9 and 10 are similar views showing a further modification of the invention;

Fig. 11 is an enlarged sectional view taken on line 11—11 of Fig. 7;

Fig. 12 is an enlarged sectional view taken on line 12—12 of Fig. 9.

Figure 1:
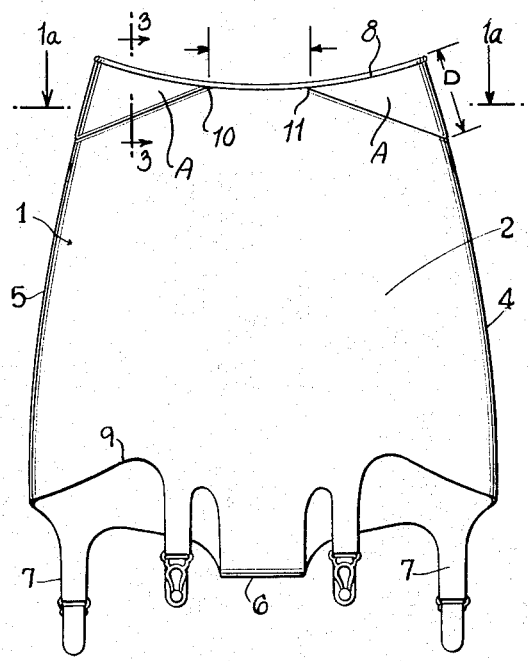
Fig. 1 is a view in front elevation of a girdle embodying the invention, the girdle being shown as made and not as in use.
Figure 2:
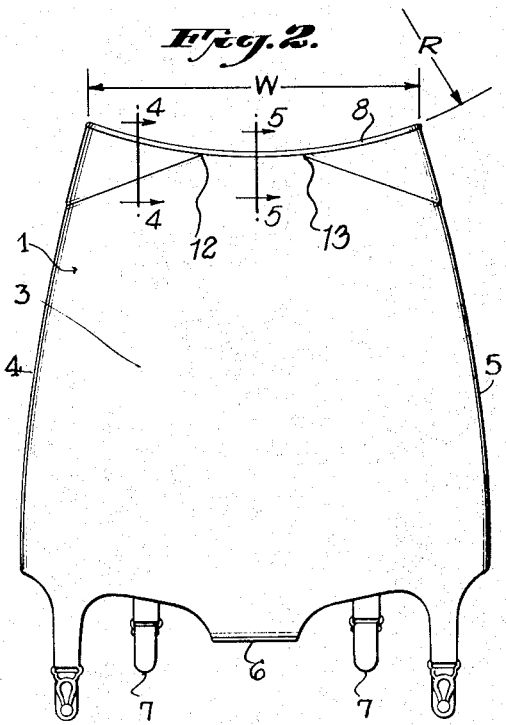
Fig. 2 is a view in rear elevation of the girdle shown in Fig. 1.
Figure 3:
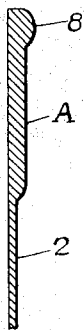
Fig. 3 is a greatly enlarged sectional view taken on line 3—3 of Fig. 1.
Figure 4:
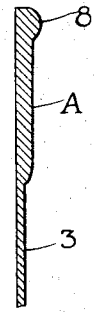
Fig. 4 is a greatly enlarged sectional view taken on line 4—4 of Fig. 2.
Figure 5:
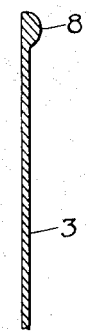
Fig. 5 is a greatly enlarged sectional view taken on line 5—5 of Fig. 2.
Figure 1A:
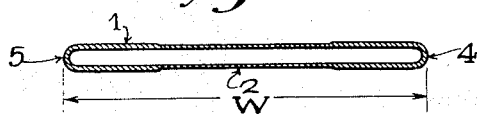
Fig. 1a is a sectional view taken at the line 1a—1a of Fig. 1.

Referring more particularly to Figure 1 to 2 of the drawings, I have shown shape-retaining stiffened areas adjacent the hips, in a rubber latex deposited girdle. Such girdle comprises a front panel 2 and a rear panel 3 interconnected at their respectively laterally opposite sides, as at 4 and 5 (Fig. 1a). The side portions 4 and 5 preferably being of arcuate or curved form as viewed in Fig. 1a and the sides of the girdle preferably being defined by arcuate lines as viewed in Figs. 1 and 2. In this embodiment the girdle takes the form of a pantie girdle and is therefore provided with a crotch portion 6, and is also shown as provided with garter tabs such as 7. In general, the structure of the body takes the form of a thin sheet-like seamless restricting wall for elastically encircling the lower portion of the female torso. The normal wall thickness, i. e. except possibly for the limited areas to be more particularly referred to, is preferably of the order of .024" but may vary in accordance with size, personal preference or degree of control needed. The openings at the top and bottom of the girdle may be provided with reinforced edges, the upper edge being beaded and designated as 8 and the lower edge bead 9.

In order to prevent the upper edge of the girdle at the waist from collapsing I have devised areas designated in general as A so proportioned, shaped and disposed as to effect the desired stiffening shape-retaining characteristics without detracting from other desirable characteristics. For example, these areas may be about .045" thicker than the normal wall thickness of the body depending on how the shape-retaining feature is added. These areas may be disposed with their upper edges closely adjacent the upper girdle edge, and their greatest depth or downward extent D may be placed at the girdle sides, such as 4 and 5, from where the depth of these areas may decrease toward the center of the girdle. The distance D may be about 3".

On the front panel 2 (Fig. 1) the areas A may taper gradually along lines which meet the upper edge at points designated respectively 10 and 11 and define the inward extent of the areas. The points 10 and 11 may be spaced apart if desired, depending on the elasticity desired in the waist. On the rear panel the areas A also may taper gradually along lines which meet the upper edge at points designated 12 and 13 respectively. These points may be spaced further apart in the rear panel than they are in the front because there is less need for protection against collapse in the back of the body. The upper edges of the front and back panels are preferably concave, and in the present embodiment follow an arc whose radius R varies from about 20" to 32" depending upon the size of the girdle.

When the stiffened shape-retaining rubber latex areas are proportioned, shaped and disposed as above described the elasticity at the waist zone is still satisfactory for general use. It will thus be seen that I have provided a substantially non-roll girdle while retaining other attributes.

As is well known from the prior art, and more especially as fully set forth in said Spanel patent, girdles of the type described are deposited on a form. In one embodiment of my invention wherein stiffening is obtained by thickening, the shape-retaining areas A are formed as deposited rubber latex while the girdle is on such form and preferably before the full normal wall thickness has been reached. For example: for a girdle of .024" normal wall thickness I may deposit only to .020" thickness, then dip each corner in a suitable coagulant so that the coagulant is deposited only throughout the areas A, then dip the entire girdle while still on the form in rubber latex and hold it there until the thickened areas have been built up to the desired thickness (for example to .040" or more), during which period only .004" has been deposited on the remainder of the girdle which was not coated with the coagulant.

The coagulant process which I have found satisfactory is to dip the corners of the girdle deposited to .020" in a coagulant consisting of an aqueous solution of calcium nitrate, and a suitable wetting agent, i. e., comprising from 50% to 90% water and from 50% to 10% calcium nitrate and said wetting agent; drying the coagulant coating to a point where the coagulant film comprises from about 0% to 80% water content; then immersing the girdle in rubber latex and holding the same there for a suitable time, say one to ten minutes (depending upon the total solids of the mix), during which time the added thickness caused by the coagulant reaches to about .045" and the remainder of the garment which is uncoated with the coagulant increases by approximately .004" to provide the desired normal body thickness of about .024".

It will be understood by those skilled in the art that in forming latex deposited girdles the major thickness of the body portion may be made by alternately dipping the form in a coagulant and then in rubber latex to build up the body structure to the desired thickness of about .020", then dipping the corners only of the deposited film to the desired thickness and add to the remainder of the entire girdle the last increment of thickness of about .004" in a last dipping; or in the alternative the entire normal body thickness of about .024" may be provided by the use of a coagulant in one dipping and thereafter the shape retaining area may be added by dipping the corners of the body in a coagulant and then in the latex bath for sufficient time to form the stiffened shape-retaining areas.

Figure 6:
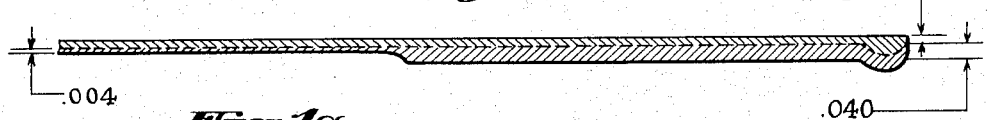
Fig. 6 is a further enlarged somewhat schematic cross-sectional view corresponding to Fig. 3 and showing a manner of constructing portions of the device of Fig. 1.

However, I prefer to build up the normal body thickness by repeated dippings in the manner well understood to those skilled in the art. For example, the form is dipped in the rubber latex, removed and dried to produce a resultant thickness of about .004", and this process is repeated for a total of five dippings and dried to produce a body thickness of about .020", then each corner of the form commensurate with the stiffened area is dipped in the coagulant so as to deposit the coagulant on the girdle areas corresponding to A, then dipping the entire girdle in the latex bath and holding the same there for about ten minutes during which time there is deposited upon the areas A the additional thickness of about .040" and on the remainder of the body which has not been coated with the coagulant an additional increment of .004"; the entire girdle on the form is removed, dried and cured in the usual manner. Precured latex may also be used. In Fig. 6 I have shown a schematic enlarged section to illustrate this preferred process and have indicated the dimensions used in the preceding example, but it will be understood that these dimensions are relative and may be varied.

I prefer to form the stiffened shape-retaining areas with straight upwardly inclined lines defining the lower edges and so aligned on the front and back panels to permit depositing the increased thickness in these areas in the manner above described. However, these areas may be made in other ways within the contemplation of the invention.

Referring to Figs. 7 and 8: I have shown a one-piece deposited girdle designated in general as 20 and comprising a front panel 21 and rear panel 22 interconnected at the sides 23 and 24 and having a slightly modified body form in that the crotch portion has been omitted. Otherwise the girdle is identical with that previously described except for the different form of the shape-retaining areas now to be described. The shape-retaining areas are designated $A_1$—$A_1$ and in this embodiment are applied as patches, instead of by coagulant dipping and depositing as in the previous embodiment. These patches are cemented on a wall of slightly less than the desired thickness, say .020", and thereafter the girdle is again dipped in latex and the remaining increment of say .004" is deposited. Fig. 11 somewhat diagrammatically illustrates this in which the patch is designated 25 and is shown disposed on the major body layer M and covered by the other increment or body layer $i$; it being understood that the patch is preferably made from a rubber latex sheet and the last increment of body thickness $i$ adheres as a substantially homogeneous continuation of the layer M and patch 25. Also the thickened areas are defined by lower curved edges and on the front panel terminate in slightly rounded ends, instead of the straight lines and wedge-shaped ends of the previous embodiment. While the shape of these patches in Figs. 7 and 8 is somewhat more pleasing than the shape of the patches in Figs. 1 and 2, they are more difficult to make. On the rear panel stiffened areas are spaced still further apart than they are on the front, due to the concave contour of the upper edge of the rear panel which may be provided on existing girdle forms to reduce the tightness around the waist caused by the additional thickness of the areas A.

In Figs. 9 and 10 the girdle body 30, comprising a front panel 31 and rear panel 32 interconnected by sides 33 and 34 is of the identical form shown in Figs. 1 and 2, and the only difference between the embodiment of Figs. 9 and 10 and 1 and 2 resides in the shape-retaining areas $A_2$—$A_2$ which in this instance are also made of separately applied patches such as 35 which are of the same shape as the areas A in Figs. 1 and 2 but are cemented onto the wall of completed thickness and are not covered over by a final increment of latex deposit as in Figs. 7 and 8. This form, while serviceable is less attractive than either of the previous embodiments. Should it be desired, the form may be recessed in the region of the shape-retaining areas so that the extra thickness may be accommodated therein, giving the outer surface a smooth configuration when the girdle is turned inside-out during the process of providing a moisture absorbing inside surface, as taught in the copending application of Harry Jacob Barth, Ser. No. 226,081, entitled: Latex Girdles with a Lining of Fibers, now U. S. Patent Number 2,636,173.

A compound which may be employed for reducing the thickness of the shape-retaining areas of the girdle is as follows:

| | Parts by weight of dry solids |
|---|---|
| Centrifuged latex | 100 |
| "Kralac"[1] latex | 25 |
| Potassium Hydroxide | 0.5 |
| Sulfur | 1.0 |
| Zinc oxide | 1.0 |
| Tetramethyl thuiram disulfide | 1.0 |

[1] Trade name for synthetic latex comprising about 85% styrene and 15% butadiene.

In the foregoing I have described a method of depositing rubber latex girdles that possess film-like walls having the requisite sheerness, flexibility, and elasticity to embrace the body yet are capable of supporting certain portions of the body by the use of stiffened shape-retaining areas forming a part of the filmy walls.

These stiffened shape-retaining areas preferably extend to the reinforced edges of the garment which thus serve to anchor the areas.

The elastic film material, normally capable of being used only in tension, is by my improvement modified to enable the film to receive compressive forces, which modification furnishes the stiffened shape-retaining character of the areas involved. Such modification provides the support which resists collapse of the film yet retains sufficient elasticity needed for enabling the girdle to be stretched when applying to the body. The retention of elasticity also aids in maintaining the girdle in position so that the stiffened shape-retaining areas may function for example to prevent rolling over at the margins.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and my new results accomplished, as it is obvious that the particular embodiments shown herein and described are only some of the many that can be employed to attain these objects and accomplish these results.

I claim:

1. A supporting girdle of the type having a restricting wall readily stretchable in transverse and longitudinal directions for encircling the lower portion of the human torso, comprising an upper elastic wall portion including front and rear panels interconnected at their corresponding laterally disposed sides, said wall portion being thickened throughout areas disposed on laterally opposite sides of the center of said girdle, said thickened areas extending from the upper edge downwardly at respectively opposite sides and thence inwardly over said front and rear panels toward the center of said girdle and terminating closely adjacent the upper edges of said front and rear panels, said inwardly extending portions of said thickened areas gradually diminishing in width from the sides of said girdle toward the center, the innermost extent of said thickened areas on said front panel being disposed relative to each other.

2. A deposited rubber latex girdle having a restricting wall readily stretchable in transverse and longitudinal directions for encircling the lower portion of the human torso, comprising an upper elastic wall portion including front and rear panels interconnected at their corresponding laterally disposed sides, said wall portion being stiffened against compression throughout areas disposed on laterally opposite sides of the center of said girdle, said stiffened areas extending from the upper edge downwardly at respectively opposite sides and thence inwardly over said front and rear panels toward the center of said girdle and terminating adjacent the upper edges of said front and rear panels, said inwardly extending portions of said stiffened areas diminishing in width from the sides of said girdle toward the center.

3. A deposited rubber latex girdle for use on the human body comprising a pre-formed readily collapsible thin elastic wall having an upper elastic wall portion including front and rear panels interconnected at their corresponding laterally disposed sides, said wall portion being thickened throughout shape-retaining areas disposed on laterally opposite sides of the center of said girdle, said thickened shape-retaining areas extending from the upper edge downwardly at respectively opposite sides and thence inwardly over said front and rear panels toward the center of said girdle and terminating adjacent the upper edges of said front and rear panels, said inwardly extending portions of said thickened shape-retaining areas diminishing in width from the sides of said girdle toward the center.

4. The deposited latex girdle of claim 3 wherein said thickened shape-retaining areas include part of the peripheral edge of the girdle.

5. The deposited latex girdle of claim 3 wherein each of the thickened shape retaining areas is in the form of an inverted triangle, the two sides of the triangle lying in the same plane through the girdle as formed.

6. The deposited latex girdle of claim 3 wherein the shape-retaining areas are thickened with deposited latex.

7. A deposited rubber latex foundation garment for use on the human body, comprising a pre-formed, readily collapsible, relatively thin elastic wall, provided with a waist opening having a peripheral edge, and shape-retaining areas stiffened against compression in a direction normal to the waist opening and positioned on the wall in areas corresponding to each of the hip regions of the wearer so as to resist rolling over of the garment in said hip regions, said shape-retaining areas extending less than the periphery of said edge with the adjacent lateral boundaries of said stiffened areas being spaced substantial distances apart from each other to minimize interference with the elastic stretch of the thin elastic walls at the waist opening, said shape-retaining areas being made of latex.

8. The deposited rubber latex foundation garment of claim 7 wherein the shape-retaining areas are positioned below the peripheral edge of the waist opening to avoid stiffening said edge.

References Cited in the file of this patent

UNITED STATES PATENTS

| | | |
|---|---|---|
| 2,324,735 | Spanel | July 20, 1943 |
| 2,360,736 | Spanel | Oct. 17, 1944 |
| 2,371,883 | Gammeter et al. | Mar. 20, 1945 |
| 2,428,127 | Sidnell | Sept. 30, 1947 |
| 2,528,980 | Spanel | Nov. 7, 1950 |